US012136003B1

(12) United States Patent
Wu et al.

(10) Patent No.: US 12,136,003 B1
(45) Date of Patent: Nov. 5, 2024

(54) SEMANTIC MAPPING

(71) Applicant: Conviva Inc., Foster City, CA (US)

(72) Inventors: Haijie Wu, Lafayette, CA (US);
Konstantin Shinkarenko, Prague (CZ);
Jose Caldeira Jesus, London (GB);
Aditya Ravikumar Ganjam, Foster City, CA (US); Hui Zhang, Burlingame, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 18/390,879

(22) Filed: Dec. 20, 2023

(51) Int. Cl.
*G06F 9/54* (2006.01)

(52) U.S. Cl.
CPC .................................... *G06F 9/542* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | |
|---|---|---|---|
| 7,668,794 B2* | 2/2010 | Wang | G06Q 10/087 455/342 |
| 10,148,674 B2* | 12/2018 | McLean | H04L 63/1416 |
| 10,628,455 B2* | 4/2020 | Milijasevic | A63F 13/79 |
| 10,812,711 B2* | 10/2020 | Sapienza | H04N 23/65 |
| 2018/0060334 A1* | 3/2018 | Jensen | G06F 16/3344 |
| 2019/0267118 A1* | 8/2019 | Miled | G16H 10/60 |
| 2023/0077056 A1* | 3/2023 | Sethumadhavan | G06Q 50/22 |

* cited by examiner

*Primary Examiner* — Andy Ho
(74) *Attorney, Agent, or Firm* — Van Pelt, Yi & James LLP

(57) ABSTRACT

Determining a stateful metric includes receiving a first mapped event that is generated based on semantic mapping of a first raw event associated with a first time. It further includes receiving a second mapped event that is generated based on semantic mapping of a second raw event associated with a second time that is subsequent to the first time. It further includes determining a stateful metric based on the first mapped event and the second mapped event.

19 Claims, 14 Drawing Sheets

FIG. 2A

CONVIVA App Experience

Semantic Mapper | Event Management | Metric Builder | Metric Management | Deployment a1.USabc ▼ (UTC+02:00)

All Traffic

+Map New Event | Quick Map | ⊗ Block Event — 202

Browse: Explore & Map Event — 208 / 204 / 206

All Event

| Name | ↑↓Total Events 3.69M | Unmapped | Mapped |
|---|---|---|---|
| ▽ ALL | | | |
| conviva_network_req... | | Mapped | Blocked 2.01 M ⋮ |
| conviva_screen_view | | Mapped | 580 K ⋮ |
| screen_view | | Mapped | 407 K ⋮ |
| conviva_button_click | | Mapped | 140 K ⋮ |
| seek_forward | | Mapped | 105 K ⋮ |
| video_play | | Mapped | 63.8 K ⋮ |
| pause | | Mapped | 63 K ⋮ |

Event Tag key

| Name | ↑↓Total Events 3.69 M | Unmapped | Mapped |
|---|---|---|---|
| ▽ ALL | | | |
| network_request_target_url | | | 2.01 M |
| network_request_response_code | | | 2.01 M |
| network_request_url_host | | | 2.01 M |
| network_request_url_scheme | | | 2.01 M |
| network_request_http_method | | | 2.01 M |
| network_request_url_query | | | 2.01 M |
| network_request_url_path | | | 2.01 M |

Event Tag key

| Name | ↑↓Total Events 3.69 M | Unmapped | Mapped |
|---|---|---|---|
| ▽ ALL | | | |
| | https | Mapped | 2.13 M |
| | 200 | Mapped | 2.01 M |
| | GET | Mapped | 1.87 M |
| | api.acme.us | Mapped | 1.75 M |
| | player | Mapped | 1.59 M |
| | player_interaction | Mapped | 520 K |
| | | Mapped | 418 K |

Event Category ▽

| Name | ↑↓Total Events 3.69 M |
|---|---|
| Page | 843 K |
| Custom | 511 K |

Title ▽

| Name | ↑↓Total Events 3.69 M |
|---|---|
| vod_player | 3.11 M |
| | 161 K |

Application Build ▽

| Name | ↑↓Total Events 3.69 M |
|---|---|
| 12345 | 1.95 M |
| 67890 | 990 K |

Size: Auto ▽

Mapped Event

| Name | ↑↓ |
|---|---|
| CVV Screen View | 580 K |
| User seek action | 188 K |
| CVV Button Click | 140 K |
| All EPG Views | 98.2 K |
| Video Manifest Request | 87.2 K |
| Video Play | 63.8 K |
| EPG Screenview | 46.3 K |

≡ ◆ CONVIVA App Experience | a1.USabc ▼ | ◉ | ✳◉

| Semantic Mapper | Event Management | Metric Builder | Metric Management | Deployment |

[ screen_view AND screen_type AND player × ] [◆ Add To Rule]—218

◆ Semantic Mapper
Set Mapping Rules —222

① Event Name* = screen_view

⋮⋮ [1:1] Tag Key = screen_type —224  Tag Value [equals] player —226   Delete All 🗑

⊕ Add OR Rule  ⊕ Add AND Rule                                                    🗑

⊕ Add Metadata Rule

⊕ Add New Event Rule

—220

Set Mapped Event —228

Please Select... ▼

Mapped Event Name*

Type or Select... ▼

▦ Browse: Explore & Map Event —212

All Event ▼ ⊟    ↕ Total Events 108 K    🔍
Name          ▽ ALL Unmapped Mapped screen_view              Mapped    108 K Event Tag key ⊟    ↕ Total Events 108 K    —214
Name          ▽ ALL Unmapped Mapped    🔍 screen_type              108 K

Event Tag Value ⊟    ↕ Total Events 108 K    —216
Name          ▽ ALL Unmapped Mapped    🔍 player                  Mapped    108 K

Size: Auto ▼ ⊞
Mapped Event ⊟
Name          ↕

Add reminder          0 📝
Add to series         0 📝
Added to watchlist    0 📝
Create profile        0 📝
EPG Screenview        0 📝

FIG. 2B

Raw Event: {
    "event_name": "conviva_network_request",
    "event_data": {"url": "conviva.com/movie",
            "action": "Post",
            "code": 200,
            .
            .
            .
            }
    }

Mapped Event: {
    "event_name": "clicking_movies",
    "event_data": {"url": "conviva.com/movie",
            "action": "Post",
            "code": 200,
            .
            .
            .
            }
    }

SEMANTIC MAPPING

BACKGROUND OF THE INVENTION

Software applications may be installed on numerous client computing devices of disparate types, such as mobile devices, desktop devices, set-top boxes, etc. Oftentimes, developers of such applications would like to understand the behavior that is occurring within such applications. In order to do so, developers of the application write sensor code within the client-side application to cause events to be sent to a backend for analytics. However, writing and deploying client-side code that can emit events in a manner that is interpretable for analytics to be computed later can be a challenging process. For example, after the sensor code is written and deployed, it is frozen and fixed in the sensor of the application, in which case it cannot be easily changed later on. It would be beneficial if events from sensors in applications could be flexibly processed in a manner that is conducive for determining analytics and insights.

BRIEF DESCRIPTION OF THE DRAWINGS

Various embodiments of the invention are disclosed in the following detailed description and the accompanying drawings.

FIG. 2A illustrates an embodiment of a user interface for configuring semantic mapping functions.

FIG. 2B illustrates an embodiment of a user interface for configuring a semantic mapping rule.

FIG. 5B illustrates a data structure example of a raw event.

FIG. 5C illustrates a data structure example of a mapped event.

DETAILED DESCRIPTION

Figure 1:
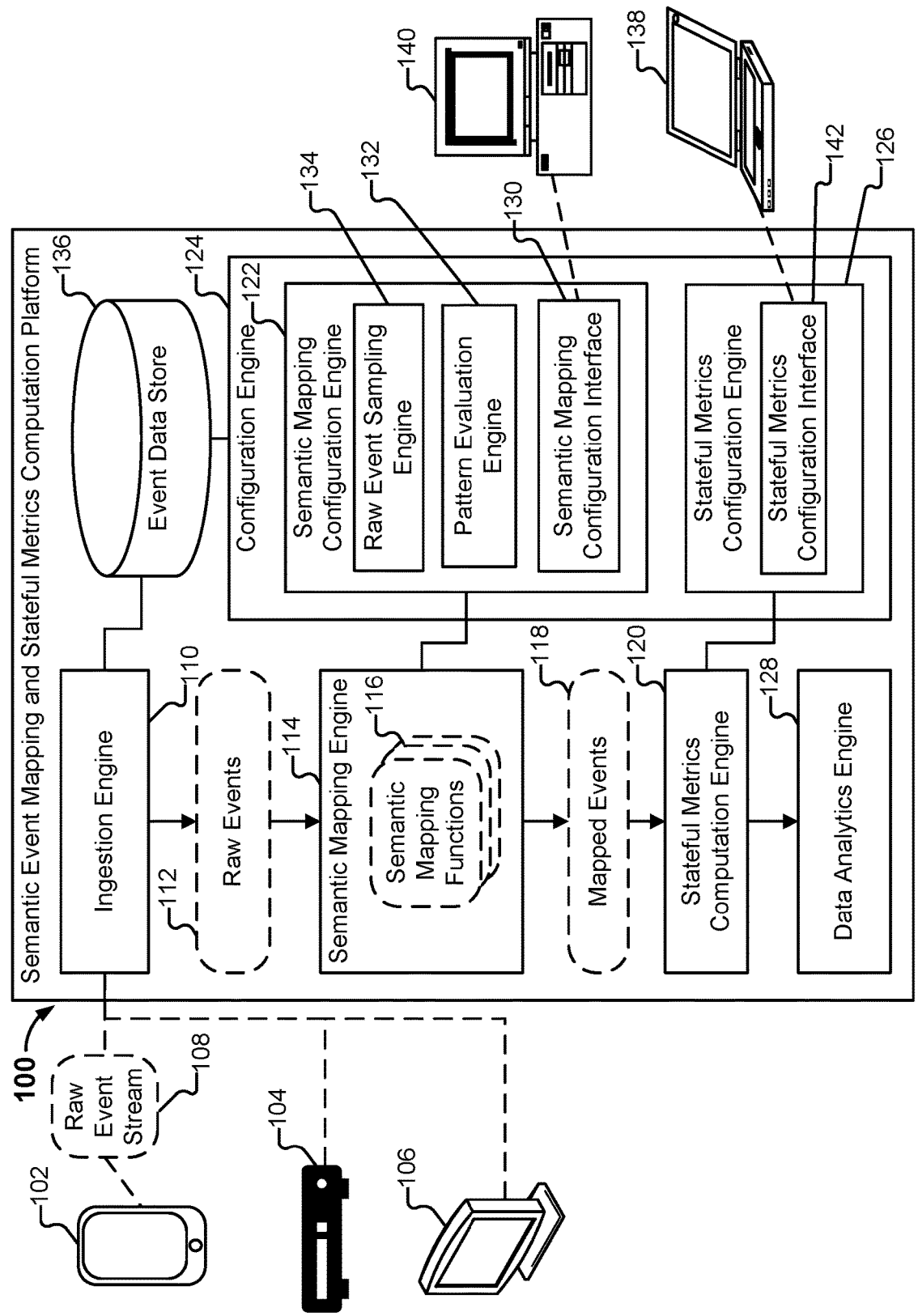
FIG. 1 illustrates an embodiment of a system for performing semantic mapping and computation of stateful metrics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of techniques for performing semantic mapping and stateful metrics computations. In some embodiments, stateful metrics include metrics whose computation is dependent on the correlation of multiple events that may occur separated in time.

Defining such stateful metrics, which are dependent on the occurrence of multiple events in order to be computed, can be complex and difficult without the user/designer of the stateful metric having an understanding of the available events that are being captured/reported by application sensors. For example, raw events that are collected often have little semantic meaning to users, and thus it can be difficult for users to navigate raw events when determining which ones should be included in a metrics computation (and how they should be integrated).

As will be described in further detail below, the semantic mapping techniques described herein facilitate the applying or mapping of semantic meaning to raw events. When metrics designers wish to create a new stateful metric, they are then able to navigate the semantically-mapped events to more easily and understandably compute stateful metrics that are dependent on the occurrence of multiple types of events separated in time.

Further as will be described in further detail, the semantic mapping of raw events is pushed to the backend, rather than being deployed in client-side sensors. The performing of semantic mapping at the backend provides various benefits. For example, this allows the flexible creation of semantically-mapped events without having to deploy client-side changes to effect modifications to how raw events are emitted. Rather, client sensors can continue to emit raw events as is.

While examples in the video-streaming/video playback analytics space are described herein for illustrative purposes, the techniques described herein may be variously adapted for capturing and analyzing information from any other type of application, as appropriate. For example, the semantic mapping and stateful computation techniques described herein may be used to capture various types of information within various applications, such as website applications, mobile applications, and set-top box applications across industries such as ecommerce, healthcare, banking, gaming, etc.

FIG. 1 illustrates an embodiment of a system for performing semantic mapping and computation of stateful metrics.

In this example, client devices 102, 104, and 106 are examples of, respectively, a mobile phone, set-top box, and smart television. In the example of FIG. 1, the client devices include video applications configured to stream audiovisual content. In this example, the client devices 102, 104, and 106 include sensor libraries (implemented, for example, as software development kits (SDKs)). In some embodiments, a sensor library is configured to collect raw events about video playback and transmit them (for example, via a network such as the Internet) to backend or platform 100, which is configured to facilitate semantic event mapping and metrics computation.

Platform 100 may be implemented in a variety of ways. As one example, platform 100 is implemented using Scala or Apache Spark. In some embodiments, platform 100 is implemented in part using a database, which may be implemented via ClickHouse, BigQuery, Snowflake, or any other database as appropriate. For example, platform 100 includes a high-scale analytics database that can be queried. The database portion may be used to support various functionality provided by platform 100, such as navigation of raw traffic patterns to define semantic mapping functions, as will be described in further detail below.

In the example of FIG. 1, suppose a sensor is installed in client device 102. The sensor is configured to capture raw events as they occur from the content playback application running on client device 102. For example, the raw events include raw events that are emitted with respect to a video session during which a piece of content is played. The session may be identified by a video session identifier. Examples of raw events include system level events that describe what is occurring in the application. Other examples of events include user events of user actions. In some embodiments, as the raw events are emitted, they are captured by the sensor and streamed (e.g., in raw event stream 108) to platform 100.

In this example, the stream of raw events is ingested by the platform via ingestion engine 110. In the example of platform 100, raw events 112 that are ingested are then passed to semantic mapping engine 114.

In some embodiments, the semantic mapping engine is configured to assign semantics to raw events. For example, raw events often do not have meaningful names that are interpretable for performing analytics. In this example, the semantic mapping engine includes a set of semantic mapping functions/rules 116. In some embodiments, each semantic mapping function includes two components: a set of raw event filtering conditions; and a semantic transformation component. In some embodiments, a raw event is compared against the filter conditions of the semantic mapping functions. For any semantic mapping functions whose filter conditions match to the raw event, the semantic transformation component of the matching semantic mapping function is invoked to generate a new mapped event object that is derived from the matching raw event. The transformation component includes a function to apply semantics to the raw event, which in some embodiments includes converting the name of the raw event to a mapped event (where the name conversion confers new semantics that are imparted on the newly created mapped event object). In some embodiments, semantic mapping functions are configured via semantic mapping configuration engine 122 of configuration engine 124. Further details regarding semantic mapping functions/rules and their configurations are described below.

As shown in the example of FIG. 1, the assigning of semantics to raw events is performed in the backend. This is in contrast to doing so at the client device. For example, assigning semantics to raw events at the client side would involve a developer of the application writing code in the client-side application to trigger the events that are sent to the backend for analytics, where, when the events are triggered, they are given a name or relevant attributes (e.g., assign semantics to those events) that are meaningful for analytics purposes. Doing so at the client-side can be challenging. For example, making changes to sensor code at the client-side can be difficult after the client-side code is frozen, making it challenging to make updates at a later time. By pushing such semantic assignment to raw events to the backend, such code need not be written in client-side applications, and semantic mapping is more easily configured and deployed. Further, performing semantic mapping on the client side also requires that the application developer be aware of analytical needs, which in many cases is not a reasonable assumption. In contrast, performing the semantic assignment at the backend allows the person assigning meaning to the data to be different from the application developer.

In contrast, by performing semantic assignment at the backend, raw events can be sent from the client as is, however they are structured. The semantic mapping is then performed at the backend. By doing so, any user of the platform can access platform 100 to identify raw events that have been ingested, and define rules to map those to a more semantically clear set of events. As will be described in further detail below, generating, from a raw event, a mapped event with assigned semantics includes, in various embodiments, renaming events, renaming metadata, or otherwise transforming a raw event into one or more semantically mapped events. As another example, the semantic mapping functions are used to unify disparate raw events (e.g., versions of raw events collected from different types of devices that are named differently but have similar semantics) to mapped events that have a common name. This provides a form of data cleaning. As another example, a single raw event may carry a large amount of information indicating the occurrence of multiple types of events. In such a case, semantic mapping functions can be written that cause multiple mapped events to be generated from the single raw events. Further examples of semantic mapping transformations are described below.

Generated mapped events 118 are passed to stateful metrics computation engine 120. In some embodiments, stateful metrics computation engine 120 is configured to compute stateful metrics. In some embodiments, a stateful metric is computed as a function of two or more mapped events that are generated from raw events that are separated in time. For example, computation of a stateful metric involves querying of mapped events, and tracking of events over time in order for the metric to be determined. Examples of such stateful metrics include interval/duration metrics, conversion metrics, etc. In some embodiments, creation of user-defined stateful metrics is configured via stateful metrics configuration engine 126 of configuration engine 124. Further details regarding configuration and computation of stateful metrics are described below.

In this example, the stateful metrics are computed based on mapped events. For example, subsequent to semantic mapping, a raw event is transformed into a mapped event that has a schema and an assigned set of semantics that make them usable for analytics. In some embodiments, stateful metrics are dependent on the correlation of multiple events. For example, the computation of a stateful metric may depend on the occurrence of prior events, which may provide context about what happened earlier. In stateful metrics, those prior events impact the computation of the stateful metric based on newer events. Examples of stateful metrics include video rebuffering time, playing time, etc. As will be described in further detail below, users are able to create stateful metrics off of those mapped events that they wish to use for analytics.

The following is an example of a stateful metric. Suppose an application, where one of the activities in that application is for a user to subscribe to a service that is in the application. As part of capturing all raw events, the stream of raw events will include events regarding button clicks, page loads, and various other transactions and successes. Suppose that an analytics developer would like to create the following stateful metrics:

a metric that determines the average time that a user takes between when the user started subscribing and when the subscribing completed successfully. This includes the duration or time between when a user starts the subscription form creation and when the subscription is finished.

a metric that determines the percentage of users that started the subscription service but never completed the subscription. This includes the percentage of users that entered into the subscription page but never completed the subscription purchase.

Both of the above examples of metrics are stateful metrics, as they would involve tracking the state of the subscription process over time. For example, computation of either of the stateful metrics relies on the identification of multiple events separated in time. For example, prior events provide contextual information about what happened earlier in time. Those prior events impact the computation or the metrics based on newer events. The above example of determining the amount of time taken to subscribe is a stateful metric, as the computation involves events that signal start and completion, where one event might have occurred several minutes earlier in the event stream. This is in contrast to stateless systems, in which such durations could not be computed. In the example of the duration or time needed for completion, computation of the metric involves recording every start subscription event that is received, and maintaining that information (e.g., the occurrence of that type of event and a timestamp indicating when that event occurred at the client application, when it was emitted by the client application, when the event was ingested or received by the backend, etc.) until the successful subscription completion event is received (with corresponding timestamp), in order for a difference to be computed.

In this example, in order to construct or configure the aforementioned subscription-related metrics, the metrics-developer would like to be able to identify events that signal the start of the subscription process, as well as events that signal whether the subscription process completed. However, the raw events may not be named or identified in such a clear way to indicate that they are related to the start and/or completion of a subscription process. Rather, as described above, the raw events may include those regarding button clicks, page loads, etc.

In some embodiments, the semantic mapping processing described above is used to apply semantics to raw events that facilitate their identification, such as when designing the example aforementioned stateful metrics. For example, a designer of semantic mappings can design a semantic rule that filters for certain occurrences of certain types of raw events, such as page loads or button clicks that are indicative of the user starting the process of subscribing to the service. For those raw events that match the semantic mapping rule, a transformation component is executed or invoked that results in the generation of a mapped event that, for example, is a version of the raw event that is renamed to be a "subscription started" mapped event (where renaming is an example of assigning semantics to the raw event).

In this example, the semantic mapping rules designer can also design or configure a semantic mapping function that filters for raw events whose attributes signal or are indicative of successful completion of subscription, and generate new mapped events (from the raw events) that are renamed to be "successfully subscribed" mapped events. For example, various events may occur during the subscription process where a user progresses through various pages. They may, for example, go through a payment process, where at the end of the payment process, the subscription process is completed—for example, after payment has completed, the user receives a page that is indicative of successful subscription. In this example case, the semantic mapping designer can write a semantic mapping function/rule that maps the raw event of the payment page to a new mapped event that is identifiable (e.g., via a new name or label) as a successful subscription event.

By applying transformations that rename the raw events to mapped events with interpretable semantics—in this case "subscription started" and "successfully subscribed" mapped events—a stateful metrics designer can easily query for mapped events (e.g., based on query terms matching to terms of mapped event names or attributes) that are indicative of subscription start and successful subscription, without having to already know or have to search through raw event metadata, which is often inconsistently structured or formatted, and oftentimes not clearly described in terms of what the raw event is for.

In this example, the stateful metrics designer can now easily identify and map those two events and create the aforementioned metrics. As shown in the above example, configuration and definition of stateful metrics is a two-step configuration process, where semantic mapping rules are defined to identify raw events of interest and map those raw events (e.g., name them in an identifiable manner) to mapped events. Stateful metrics may then be created by searching for mapped events that are semantically identifiable. For example, the semantic mapping provides interpretable meaning to raw events, which allow them to be surfaced in an understandable way (e.g., in previews of events, as will be described in further detail below) when designing user-defined stateful metrics.

During ingestion time processing of streams of raw events, there is also a two-step process, where mapped events are generated from raw events based on semantic mapping. Stateful metrics are then computed off of the mapped events. As shown in this example, stateful metrics are built and computed off of server-side transformed events.

In some embodiments, the semantic mapping and stateful metrics computation are performed in (near) real-time, as raw events are ingested by the platform. For example, in real time, a raw event is received, the raw event is transformed into a mapped event, and the mapped event is used in computation of a stateful metric. In other embodiments, the stateful metric computations can also be performed as batch processing at a later time.

Stateful metrics that are computed can be provided as output or further evaluated by data analytics engine 128. As one example, stateful metrics are computed on a per-session basis (an example of a scope of mapped events that are identified for computation of a stateful metric—further details regarding stateful metrics computation scope are described below). In some embodiments, the data analytics engine is configured to perform aggregation, such as multi-dimensional aggregation. This includes, for example, determining a dimensional roll-up or an aggregate stateful metric for a segment of sessions that share one or more dimensional values in common (e.g., sessions that share a common CDN (content delivery network), ISP (Internet Service Provider), etc.).

In the example of FIG. 1, configuration engine 124 is configured to facilitate configuration of semantic mapping functions and definitions of stateful metrics. In this example, the configuration engine includes semantic mapping configuration engine 122 and stateful metrics configuration engine 126. In this example, users such as designers use their devices, such as devices 138 and 140, to configure semantic mapping functions and/or stateful metrics via configuration interfaces. For example, a user uses their device 140 to configure semantic mapping functions via semantic mapping configuration interface 130. A stateful metrics designer uses their device 138 to configure stateful metrics via stateful metrics configuration interface 142. For example, configuration interfaces 130 and 142 provide frontends (e.g., web frontends) by which users can perform the aforementioned configuration of semantic mapping functions and stateful metrics. Further details regarding semantic mapping configuration engine 122 and stateful metrics configuration engine 126 are described below.

Semantic mapping configuration engine 122 is configured to facilitate configuration of semantic mapping functions, such as semantic mapping functions 116. In some embodiments, facilitating design of semantic mapping functions includes facilitating exploration of raw events so that users can determine what mappings they want to create (e.g., what types of semantic meanings to apply to raw events). In some embodiments, the semantic mapping configuration engine includes pattern evaluation engine 132. In some embodiments, the pattern evaluation engine is configured to identify patterns in raw event streams and present them to users to facilitate providing meaning to the raw event data. Examples of patterns include raw event traffic patterns, such as statistics regarding the raw events and their attribute values that are being ingested and observed by platform 100. For example, users are better able to determine the meaning of raw events when they are provided patterns in the raw event data. This includes identifying patterns in global raw data received from multiple devices. This global view supported by the backend ingestion of raw events from numerous clients is beneficial as compared to performing such pattern detection at the client side, where the local code sensor would be limited to the raw event data of that client device. In some embodiments, the pattern evaluation is performed using data analytics engine 128. For example, the pattern evaluation engine is implemented by the data analytics engine.

By identifying and presenting patterns in raw event data, the user-designer is provided the ability to view patterns that may be indicative of semantic meaning. In some embodiments, the patterns in the raw event data are determined by sampling raw events in streams of raw event data. For example, raw event sampling engine 134 is configured to perform sampling of raw event data that is ingested and cached or otherwise stored in event data store 136. The patterns are then determined based on evaluation of the sampled raw events.

Stateful metrics configuration engine 126 is configured to facilitate configuration and creation of stateful metrics. The following are further embodiments of configurations of semantic mapping functions, as well as the invoking of semantic mapping functions on received raw events.

FIG. 2A illustrates an embodiment of a user interface for configuring semantic mapping functions. The example of FIG. 2A illustrates an embodiment of an exploration interface usable to explore raw events when a designer is determining whether to create a semantic mapping rule from raw events.

In this example, shown at 202 are examples of raw events. These include a sampling of raw events determined using raw event sampling engine 134. In this example, the shown raw events (which may be a subset of all the different types of raw events that are being ingested) are prioritized. For example, the types of raw events shown are prioritized based on how much of a certain event has been received. In this example, the amount of the certain event is an estimate determined based from the sampling. Such statistics are an example of a pattern for the raw events determined using pattern evaluation engine 132. By providing such information about raw events, users are able to have an overview or preview of the raw events that are being ingested and their volume. Having such a preview of raw events provides a benefit of aiding the user in better understanding the semantics of raw events.

In this example, for a surfaced raw event, the user can click on the raw event to view further raw event data encapsulated in that raw event. In this example, suppose that the raw events are in a format such as a JSON (JavaScript Objection Notation) format. The JSON structure for a raw event includes an event name (as shown in panel 202). In this example, each raw event is associated with event data which includes, for example, a list of key-value pairs. At panel 204, after selecting a raw event (e.g., event 208), the event tag keys for that type of raw event are shown. This allows the user to view the types of tags or attributes that are associated with the raw event. The various tag values available for tags/keys of the event that are actually observed (based on samples) are also shown at 206. As shown at 206, the various observed tag values are also sorted or prioritized.

FIG. 2B illustrates an embodiment of a user interface for configuring a semantic mapping rule. Shown in FIG. 2B is an example of a user configuring a semantic mapping rule for a raw event. In this example, suppose that the user would like to create a mapped event that is indicative of whether a user is logging in to a video player application. In this example, the user will define filtering conditions for raw events that are indicative of logging in. For example, suppose that the user is determined to be logging in whenever the user is on a player screen.

In this example, in order to define such a logging event from raw events, as shown at 212, the user has selected the screen view raw event with the name "screen_view" from panel 202 of FIG. 2A. The user, for example, selects the event with the name "screen_view" based on it having been surfaced by the configuration user interface according to the raw event pattern evaluation described above. The user also selects the "screen_type" tag of the raw event as shown at 214. The user also selects the event tag value of "player" as shown at 216. In this example, the selection of the "player" value for the "screen_type" tag of the "screen_view" raw event in the UI corresponds to the user's desire to create a new mapped event that is indicative of the user logging in based on detecting, from raw events, that the user is on a player screen. In this example, the raw event does not have text or labels or values that explicitly refer to logging in. Rather, the designer is creating a semantic mapping function that will apply, to screen_view raw events whose screen_type tag value equals "player," a searchable semantic meaning or label indicating that a logging event has occurred.

In this example, the user's selections 212, 214, and 216 are also shown at 218 and at portion 220 of the configuration user interface example of FIG. 2B. For example, at 220 is shown a configuration of a filtering component of a semantic mapping function being configured. The filtering component is used to determine the filtering condition for identifying raw events with certain names and attributes (and values) of interest. In this example, the filtering condition is to filter for ingested raw events with the event name "screen_view" (222) that have the tag value "player" (226) for the tag key "screen_type" (224).

Figure 2C:
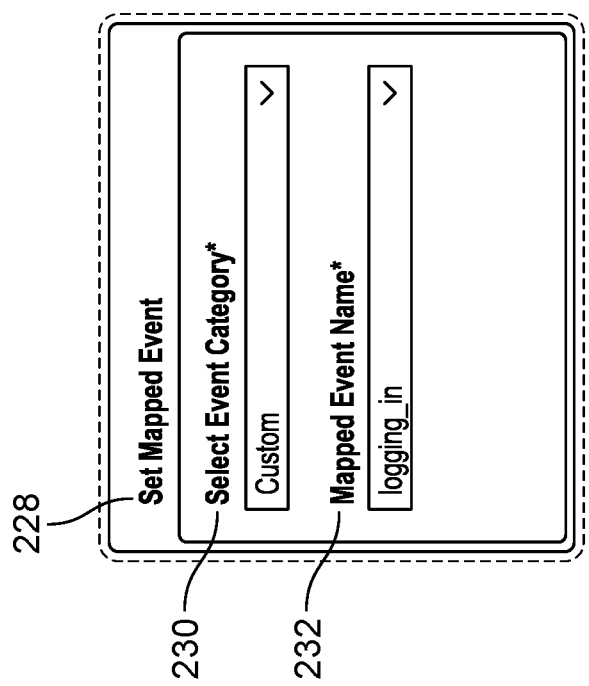
FIG. 2C illustrates an embodiment of a user interface for configuring a semantic mapping rule.

FIG. 2C illustrates an embodiment of a user interface for configuring a semantic mapping rule. In this example, configuration of a semantic transformation component of a semantic mapping function is shown. For example, the semantic transformation component defines the semantic mapping to be applied to raw events that match the filtering condition specified in the example of FIG. 2B. In this example, the user configures the transformation component by accessing portion 228 of FIG. 2B (reproduced here in the example of FIG. 2C) for setting mapped events.

In the example of FIG. 2C, the transformation component for setting mapped events includes two fields. Field 230 is for selecting a category for the mapped event (that will be generated as a result of the transformation, and that is derived from the raw event that meets the filtering conditions). In this example, the user has selected that the mapped event is a custom category of event. In some embodiments, selection of a known category results in the presentation of candidate default mapped event names that may be applicable. In this example, at field 232, the user specifies a mapped event name, or the name for the mapped event to be derived from the raw event. In some embodiments, generating a mapped event with the mapped event name is an example of applying semantics to the raw event, where the mapped event is a user-readable string or value that provides semantics describing the event. In this example, the user has specified that the generated mapped events are to have the mapped event name "Logging_In." As shown in this example, there was not a raw event with a name that is indicative of a user logging in. However, the designer has now created, via configuration of a semantic mapping rule, a new mapped event that maps raw events that show the user being on a player screen to a mapped event with a user-readable and searchable name that is now indicative of a log in event. For example, whenever a raw event meeting the filtering conditions of the semantic mapping function is identified, a new mapped event is generated with the name "logging_in." In some embodiments, the transformation component includes a function that when invoked, performs a per-event annotation by applying semantics to an instance of an ingested raw event. The semantic mapping described herein aligns the matching raw events with their actual semantics.

As will be described in further detail below, user-defined stateful metrics that are dependent on the "logging_in" event may then use the "logging_in" mapped events (generated from the ingested raw event) to perform the stateful metric computation.

In some embodiments, after completion of specifying the filtering and transformation components of the semantic mapping rule, the user is provided the option to save the semantic mapping function. For example, platform 100 maintains a set of configured semantic mapping functions. Mapped events may also be shown in the configuration interface for further analysis.

The following are further examples of configuration of semantic mapping rules/functions.

Figure 3A:
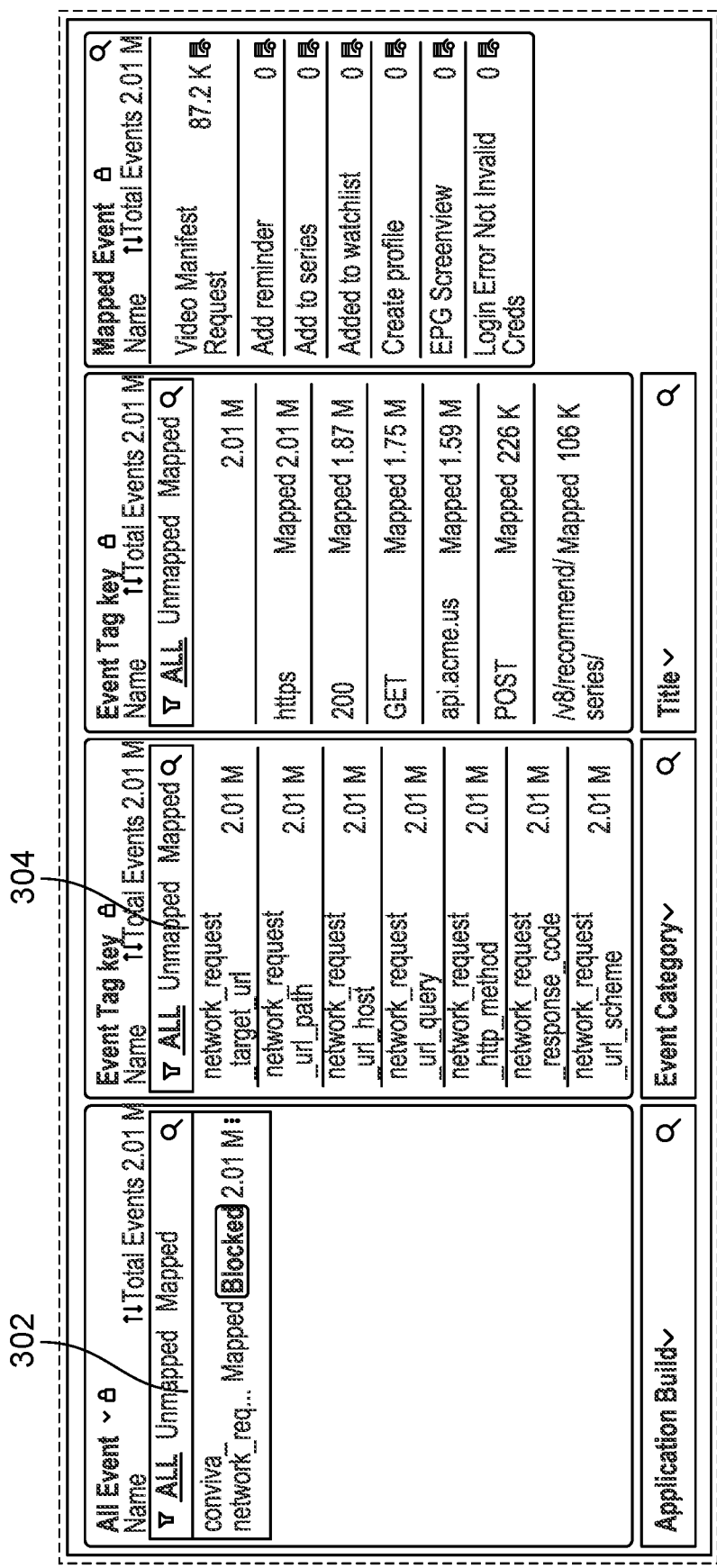
FIG. 3A illustrates an embodiment of a user interface for configuring semantic mapping.

FIG. 3A illustrates an embodiment of a user interface for configuring semantic mapping. In this example, suppose that the configuration user would like to create a new mapped event called "clicking movie" that is derived from raw events named "conviva_network_request" that have a "Target_URL" key whose value contains the string "movie." The creation of a mapped event with the semantically meaningful (and searchable) name of "clicking movie" will more easily facilitate the creation of stateful metrics, in contrast to a designer who would have to perform convoluted matching on raw event attributes and names. In the example shown, as part of determining the filtering component of the semantic mapping rule, the user has selected the raw event with the name "conviva_network_request" (302) and the event tag key "network_request_target_URL" (304).

Figure 3B:
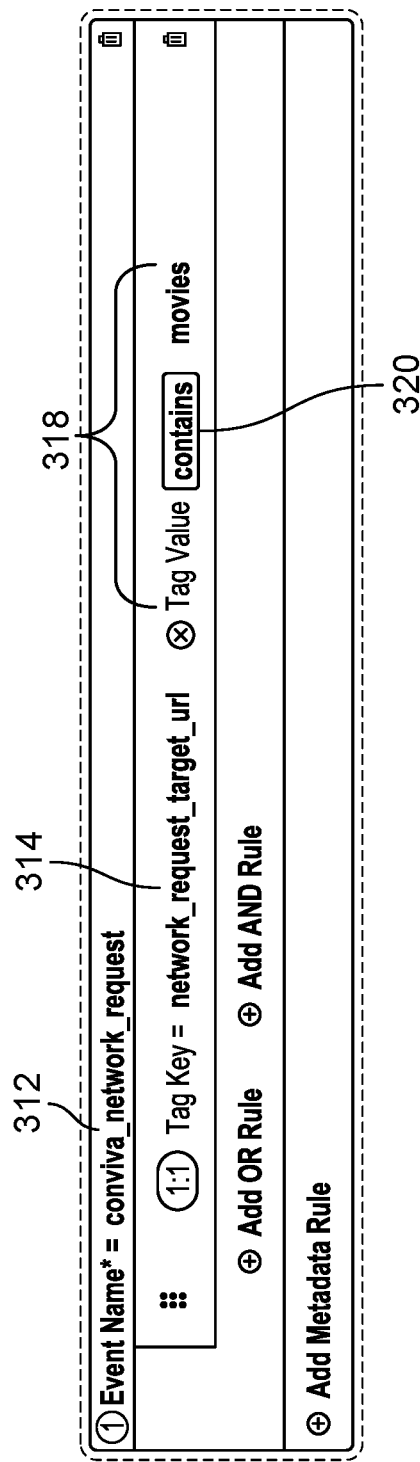
FIG. 3B illustrates an embodiment of a user interface for configuring semantic mapping.

FIG. 3B illustrates an embodiment of a user interface for configuring semantic mapping. In this example, specification of the filtering component of the new semantic mapping rule is shown. In this example, a specification of the raw event name "conviva_network_request" (312) is shown. The tag key "network_request_target_url" is specified at 314. In the example shown, the filtering condition on the tag value for the tag key is specified at 318.

In some embodiments, the condition on the tag value is selectable from a range of options. In this example, as shown at 320, the condition on the tag value is that the tag value for the tag key in the raw event contains the string "movies." Other examples of condition types on the tag value include the tag value equaling a specific value (specified by the user, for example), not equaling a specific value, or not containing a specific value.

Figure 3C:
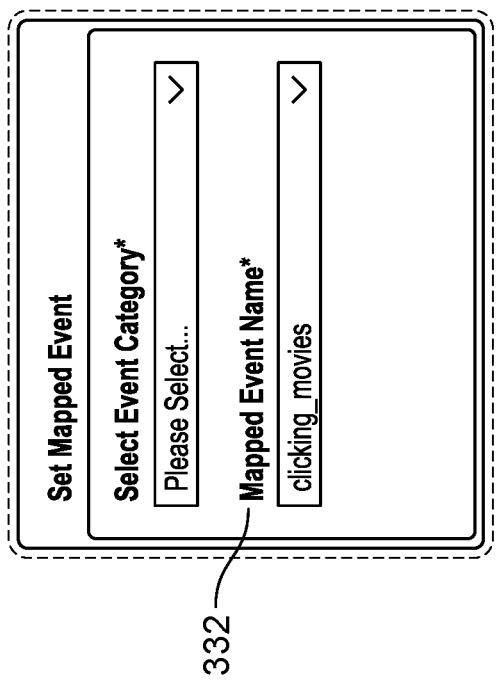
FIG. 3C illustrates an embodiment of specifying a mapping component of a semantic mapping rule.

FIG. 3C illustrates an embodiment of specifying a mapping component of a semantic mapping rule. In this example, a semantic mapping to be applied to raw events matching the filtering conditions that results in generation of a new mapped event is shown. In this example, the semantic mapping is specified at 332 by specifying a mapped event name for the new mapped events to be generated. In this example, the mapped event name is specified as "clicking movies."

In this example, upon specification of the mapped event, the new type of mapped event (with associated name) is stored and maintained in a listing of available mapped events. A stateful metrics designer may then use the new clicking movies event to create a stateful metric, such as a duration between the user clicking on a movie to the ending of the movie.

Example of Specifying Compound Filtering Conditions

In the above example of FIG. 3B, a filtering condition on a single key/value pair is shown. More complex filtering conditions may be specified for the filtering component of the semantic mapping function. For example, logical operators may be used to specify multiple filtering conditions to be matched for a raw event to meet the filtering component of the semantic mapping function.

Figure 4:
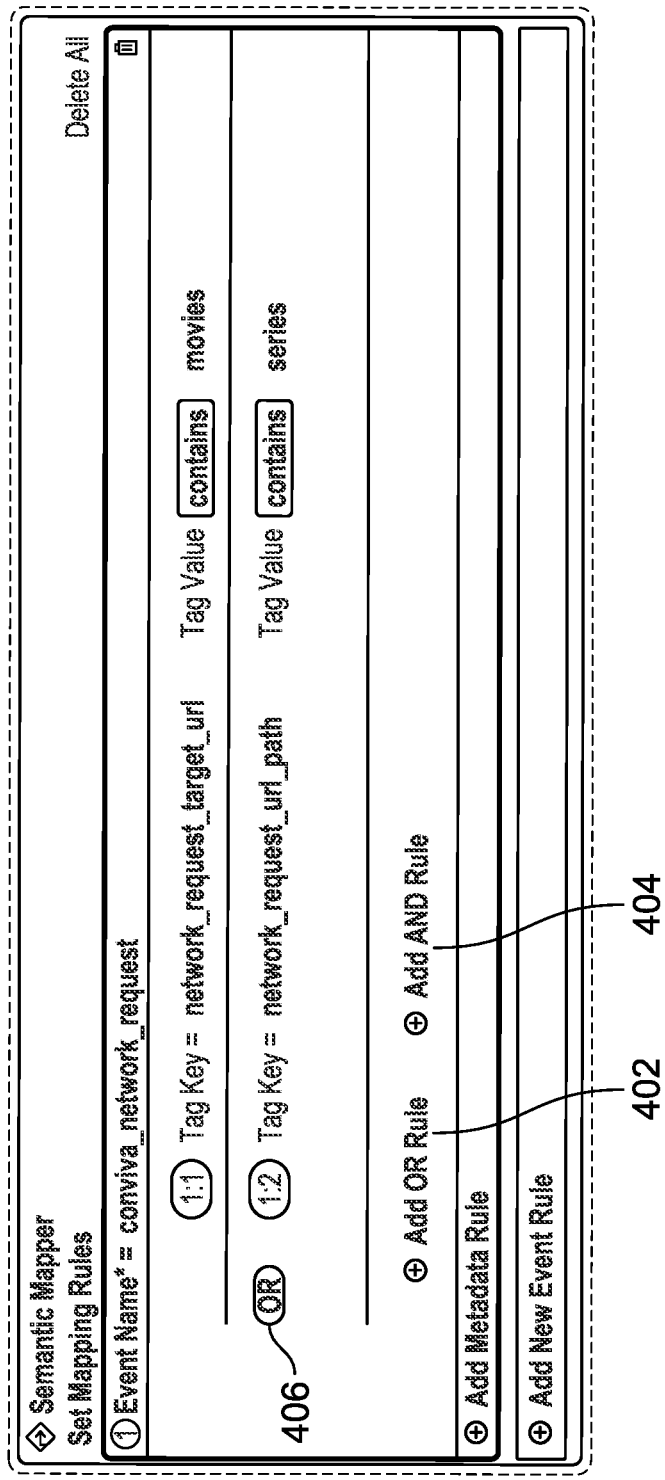
FIG. 4 illustrates an embodiment of specifying a filtering condition for a semantic mapping function.

FIG. 4 illustrates an embodiment of specifying a filtering condition for a semantic mapping function. As shown in this example, the user interface is configured to provide options for adding OR rules (402) and/or adding AND rules (404). Other types of operators for specifying filtering conditions can be specified. For example, regular expressions can be configured to determine elements of an input raw event. Other examples of operators include a determination of whether the event (or its event data) contains or does not contain certain values, whether an event attribute equals or does not equal certain values, etc. Multiple operators can be combined to express arbitrary filtering logic based on various types of terms.

In the example of FIG. 4, as compared to the example of FIG. 3B, an OR rule has been added, as shown at 406. In this example, "conviva_network_request" events with the tag key "network_request_url_path" that has a tag value that contains "series" will also match on the filtering condition of the semantic mapping function and result in triggering of a new clicking_movies mapped event.

For example, if the same setting of mapped event is configured as in the example of FIG. 3C, then raw conviva_network_request raw events with either network_request_target_url keys that contain the value "movie," or network_request_url_path keys that contain the value "series" will trigger creation of corresponding "clicking_movies" mapped events.

Generation of Mapped Events from Raw Events

The following are embodiments of ingestion-time processing in which a streamed raw event (from a client device) is semantically transformed to a mapped event. As one example, suppose the semantic mapping rule defined in the examples of FIGS. 3A-3C is saved and deployed (e.g., to semantic mapping functions 116 to be used by semantic mapping engine 114 of FIG. 1).

Figure 5A:
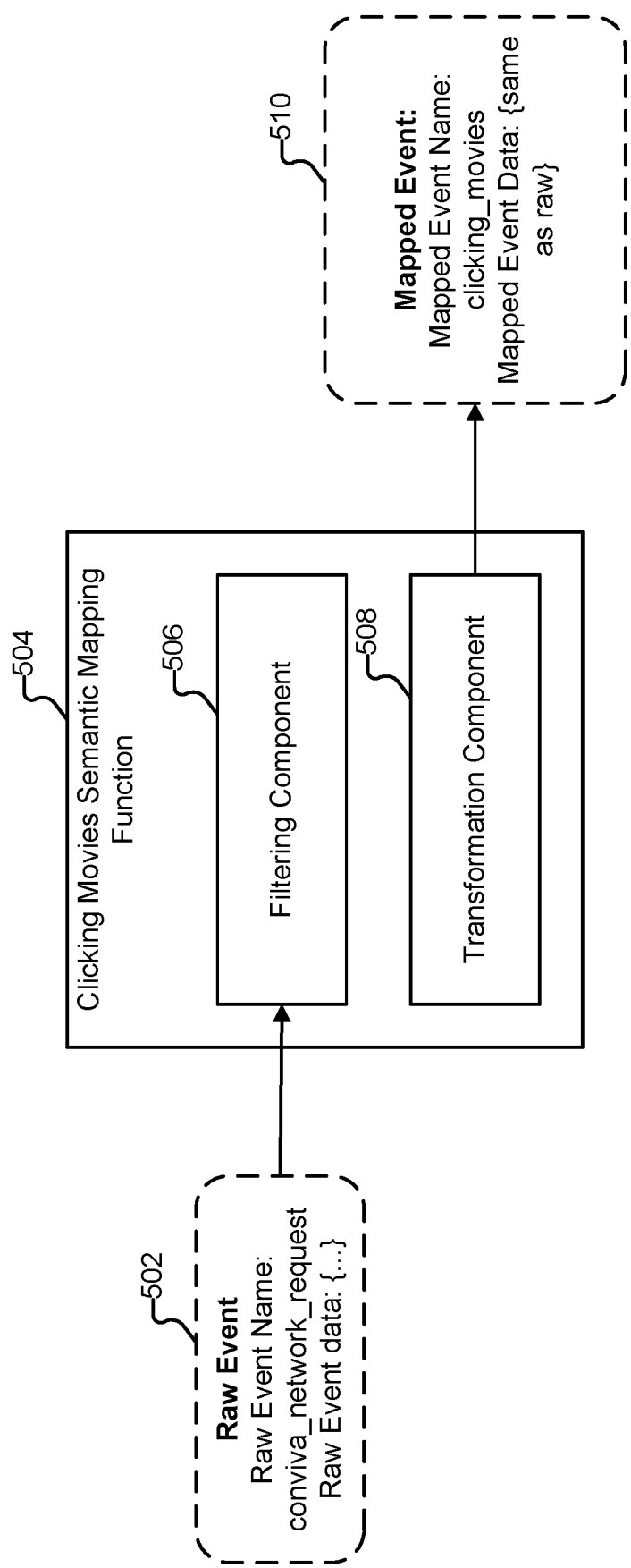
FIG. 5A illustrates an embodiment of ingestion-time semantic mapping.

FIG. 5A illustrates an embodiment of ingestion-time semantic mapping. Suppose that at ingestion time, a raw event 502 with the name "conviva_network_request" is ingested whose key "network_request_target_url" contains the value "movies." The raw event is compared against a set of semantic mapping functions. In this example, the ingested raw event matches to the filtering component 506 of clicking movies semantic mapping function 504.

According to the transformation component 508 of the clicking movies semantic mapping function, a new mapped event 510 is created with the name "clicking_movies." The following are embodiments of generating the new mapped event. As one example, the mapped event is generated as a copy of the raw event with the same structure and event attributes (e.g., key-value pairs) that describe the event. In some embodiments, timestamps associated with the raw event (e.g., of when the raw event was generated or transmitted by the client application, received or ingested or collected by the platform, etc.) are also carried over and associated with the corresponding new mapped event. The new mapped event is assigned the new semantics by assigning the mapped event name in the semantic mapping function to the new mapped event. In this example, the transformation component is a function that creates a new mapped event with a different name for all of the raw events that match the filtering conditions of the filtering component.

In the above example, a new mapped event object was created that is a copy of the matching raw event, but with a different name. For example, as platform 100 runs and ingests a stream of raw data, any incoming raw event that matches the conditions of the clicking movies semantic mapping function 504 will result in creation of a new mapped event called "clicking_movies" that inherits all of the data of the raw event, but with a different name for that event. For example, as shown in the interface example of FIG. 3A, raw events with the name "conviva_network_request" include a variety of keys with a variety of values. Those attributes (e.g., key-value pairs) will be inherited or otherwise maintained in the new mapped event object created according to the semantic mapping function. For example, if an analyst wished to see the response code for the new mapped clicking movies event, the user would still be able to access the keys/values in the original raw event that the new mapped event was generated from (as it is copied over). For example, the user can see whether the response code was 200 or 400. By doing so, the user can see whether the clicking movie request was successful (e.g., with response code 200) or failed (e.g., with response code 400). That is, the raw event attributes that describe the event are carried over in the mapped event. The mapped events are then stored. In some embodiments, the raw events are stored. In other embodiments, the original raw events are not stored. In some embodiments, a mapping or reference to the original name of the raw event is kept or maintained by platform 100 (e.g., by mapped event names and raw event names, which may be maintained in semantic mapping functions/rules, for example). In some embodiments, whether raw events are kept or stored is configurable. For example, a developer may wish to see both the mapped events and the raw events, and in such case, both raw and mapped events are stored or maintained.

FIG. 5B illustrates a data structure example of a raw event. FIG. 5C illustrates a data structure example of a mapped event. As shown in this example, the mapped event and the raw event have the same format. The event data is carried over from the raw event to the mapped event. The names of the mapped event and the raw event (names 522 and 532) are different, which is the result of applying the semantic transformation specified in the semantic mapping function whose filtering condition the raw event matched, and whose transformation component yielded the mapped name event of FIG. 5C.

As shown in this example, the transformation involved creating a new mapped event object with the same structure as the matching raw event, where the semantic transformation is the applying of a new name to the new mapped event. In this example, the mapped event inherits the event data of the raw event from which it was derived.

Embodiments of the techniques for semantic mapping described herein provide various benefits for determination of stateful metrics. For example, the semantic mapping techniques described herein dramatically reduce the complexity for users to navigate through their own raw data. For example, designers need not go all the way to the client-side application to apply a semantic meaning/name within the code of the application, which is difficult to include and also difficult to change. Rather, the semantic mapping techniques described herein facilitate efficient and flexible mapping of semantic meaning to raw events. Further, by performing semantic mapping in the backend, designers are able to flexibly test out various semantic mappings with ease. For example, designers can test different semantic mappings to determine how the applications of different types of semantics facilitate creating stateful metrics. For example, the semantic mapping is used to provide meaning to the data upon which calculations are created. That is, there is a separation between providing meaning to data and calculation of stateful metrics on the data.

The following are further examples of the flexibility provided by the semantic mapping techniques described herein. For example, the semantic mapping techniques described herein facilitate unifying disparate raw events to mapped events that are assigned the same semantics. The semantic mapping techniques described herein also facilitate the splitting or expansion of raw events to multiple mapped events. For example, some raw events may include a large amount of event data or attributes, with multiple key-value pairs that are in and of themselves indicative of different events with different meanings. Using the techniques described herein, semantic mapping functions may be configured that result in a single raw event yielding multiple different mapped events with different semantics.

Example of Unifying Semantics

The following are examples of unifying different raw events into mapped events with common or unifying semantics. In this example, two different raw events that are named differently, but refer to the same type event, are unified such that the instances of the mapped events resulting from the two raw events share the same name. In this way, a stateful metric can be configured to identify the unified mapped event name, rather than having to piecemeal aggregate together raw events by their disparate names.

Figure 6:
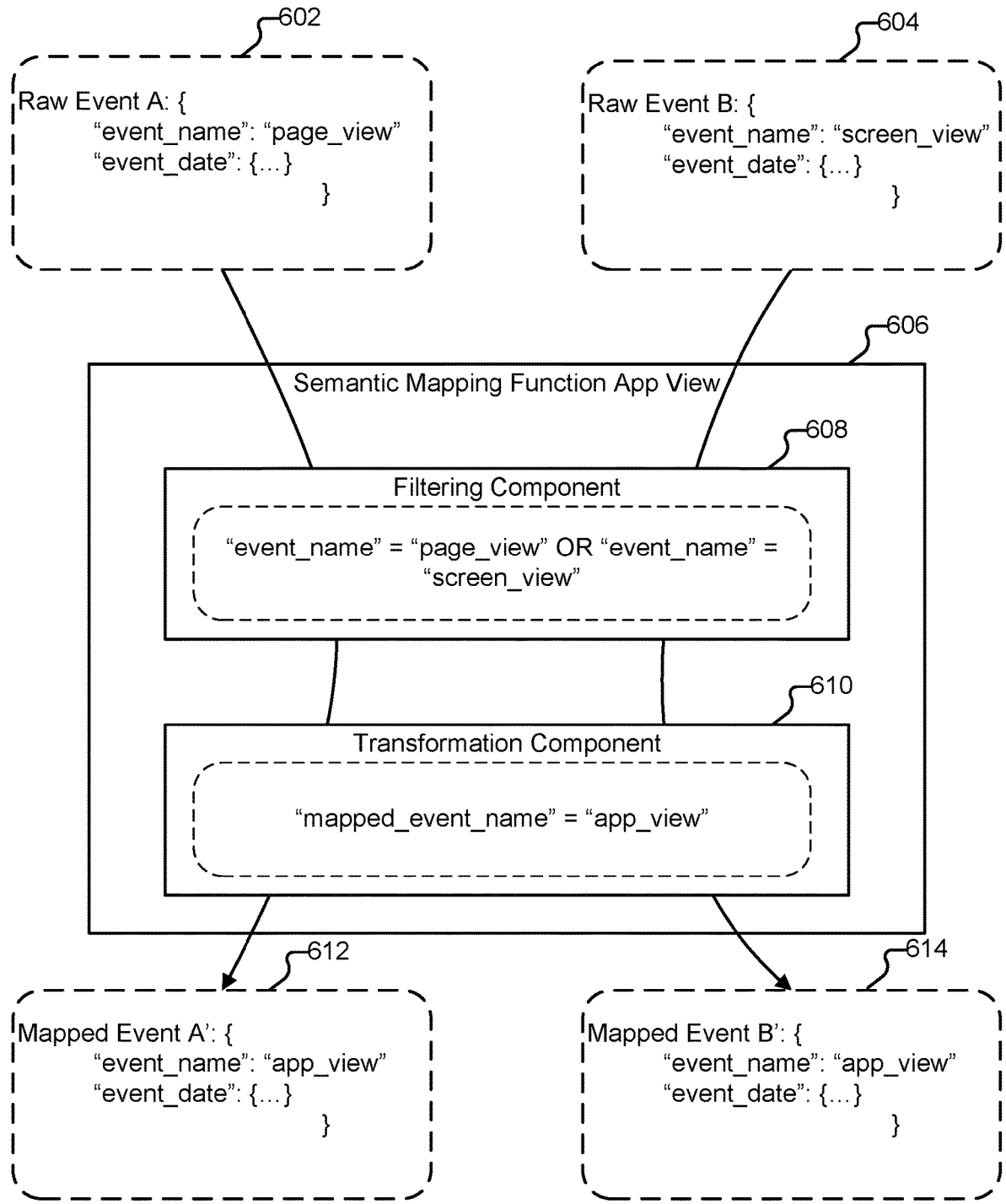
FIG. 6 illustrates an embodiment of unifying semantics of disparate raw events.

FIG. 6 illustrates an embodiment of unifying semantics of disparate raw events. In this example, suppose two applications, where one is a JavaScript application running in a browser and the other application is an iOS mobile application. The JavaScript application emits a JavaScript raw event 602 named "page_view" that is ingested by platform 100. The iOS application emits an iOS raw event 604 named "screen_view" that is ingested by platform 100. Suppose in this example that although the raw events from the two different types of client applications are named differently, they actually refer to the same type of event. As will be shown in this example, using the techniques described herein, the two different raw events will be unified with respect to names or semantics.

The following is an example of facilitating such unifying of semantics of different raw events. Referring to the example of FIG. 6, the unifying of raw event semantics is specified via configuration of a single semantic mapping function/rule 606. In this example, the filtering component 608 of the semantic mapping function includes multiple raw event filtering rules. For example, the filtering component includes a first portion for filtering conditions to apply to raw events from the JavaScript application (raw events with "event_name"="page_view" in this example). The filtering component includes a second section for filtering conditions to apply to raw events from the iOS mobile application (raw events with "event_name"="screen_view" in this example). The two portions of the filtering component are connected via a logical OR so that events that match either of the filtering conditions/rules will match to the semantic mapping function. The transformation component 610 of the semantic mapping function includes a section for setting mapping events, where any events that match any of the filtering sections of the filtering component will result in generation of new mapped events with the same (common/unified) mapped event name of "app_view." In this example, both the JavaScript and iOS raw events (602 and 604, respectively) will match to the filtering component of the same semantic mapping function 606, and two corresponding mapped events (612 and 614, respectively) are generated. As shown in this example, the naming space of the two raw events has been unified. While the two raw events previously had different raw event names, after being passed through the semantic mapping function, the resulting mapped events have the same unified semantics applied. That is two new events with the same name were generated from the original two events that had different names. In this case, event name semantics for two different types of raw events are performed so that the two events will mean the same thing in later downstream processing. For example, suppose a stateful metric that is computed based on the duration between app_view and app pause events. During processing of raw events, both the iOS and JavaScript events will result in mapped events with the same name (event semantics), "app_view." In this case, both of the mapped events derived from the raw events that were originally named differently will be used in computing the duration metric.

In other embodiments, multiple semantic mapping functions may be configured, where one semantic mapping function includes filter conditions for the JavaScript application, the second semantic mapping function includes filter conditions for the iOS mobile application, and both semantic mapping functions include a transformation component that sets the mapped event name to the same value (e.g., the common/unified name). In this example, the JavaScript raw event will match to the semantic mapping function with filter conditions for the JavaScript application, and the iOS raw event will match to the second semantic mapping function that includes filter conditions for the iOS mobile application. Each of the semantic mapping functions will result in mapped events with the same (common/unified) mapped event name.

In the example of FIG. 6, two different types of devices are sending out raw events that are semantically equivalent, but with different naming conventions. In some embodiments, the semantic transformations via the semantic mapping functions described herein allow the two differently named raw events to be interpretable by platform 100 (e.g., for metrics computation) as the same type of event. This prevents the system from storing multiple versions of the same type of event, with them being treated separately. Rather, semantically equivalent events with different raw event naming conventions can be collapsed down so that they are treated uniformly by the system (rather than disparately, if the system did not have knowledge that the events were semantically equivalent). This unifying of semantics also allows the system to determine global insights for events with the same semantics, even if the raw events from which they are derived are collected across different types of devices (as raw events from multiple types of sources are now aggregated or unified under a common semantic naming convention), where the view of the raw events is not siloed by the source that it came from.

Example of Splitting Raw Events into Multiple Mapped Events

The following are examples of splitting a raw event into multiple mapped events.

A single raw event may include numerous attributes, and thus, potentially contain high dimensional meaning. In some embodiments, semantic mapping functions can be written that take a single raw event, and split it out into multiple mapped events, each with their own semantic mapping applied. For example, a single raw event with a raw event name can be used to generate multiple new mapped events, each with different mapped event names (e.g., different semantics).

Figure 7:
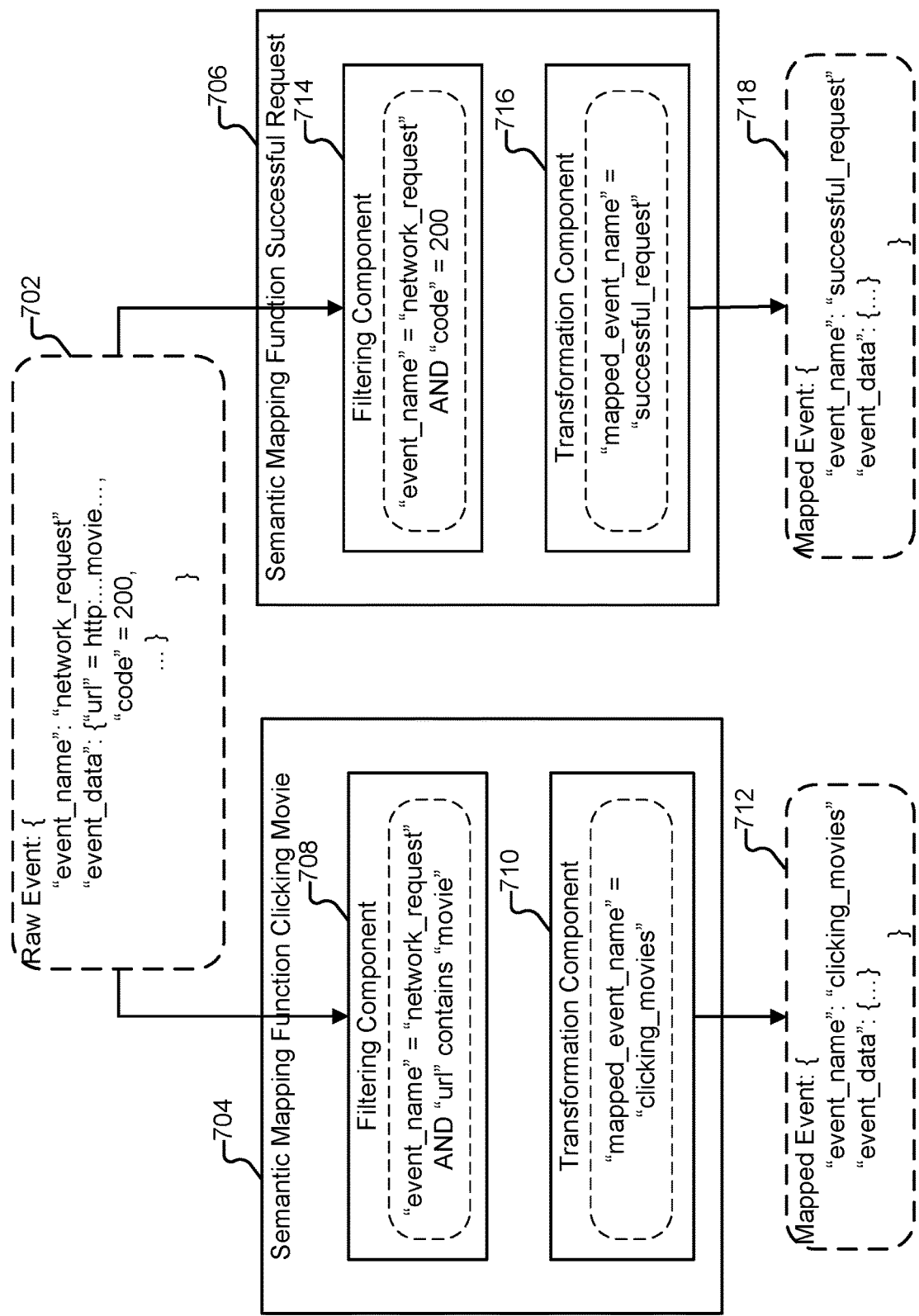
FIG. 7 illustrates an embodiment of splitting a raw event into multiple mapped events with different semantics.

FIG. 7 illustrates an embodiment of splitting a raw event into multiple mapped events with different semantics. In this example, suppose a raw event 702 that is ingested. In this example, the raw event named "network_request" includes multiple key/value pairs or attributes in its event data. For example, the event data includes a "url" key with a URL (uniform resource locator) path as its corresponding value in this raw event instance. The URL value in this example contains the string "movie." The event data also includes a "code" tag key with a corresponding value. The code value in this example is "200."

While a single raw event 702 is shown, the aforementioned key/value pairs describe two types of events. For example, the URL containing the string "movie" is indicative of a clicking movies event. Separately, the code value being 200 is indicative of another type of event, a successful request.

In order to capture the multiple events that are both encompassed by the single raw event, as one example, multiple semantic mapping functions (704 and 706 in this example) are configured. For example, semantic mapping function 704 is configured with a filtering component 708 that filters for raw events with the name "network_request" whose "url" key contains the string "movie." In response to the raw event 702 matching filtering component 708, the transformation component 710 of the clicking movie semantic mapping function 704 is configured to generate a mapped event 712 with the semantic name of "clicking_movies."

Similarly, to capture that the raw event 702 also includes an indication of a successful request event (that should be split out as its own event), semantic mapping function 706 is configured with a filtering component 714 that filters for raw events with the name "network_request" whose "code" key is equal to 200. In response to the raw event 702 also matching filtering component 714, the transformation component 716 of the successful request semantic mapping function 706 is configured to generate a mapped event 718 with the semantic name of "successful_request."

As one example, both mapping rules 704 and 706 are maintained by platform 100 (e.g., in semantic mapping functions 116). At ingestion time, the raw event 702 is passed to all of the mapping functions. Both mapping rules 704 and 706 would be triggered based on raw event 702 matching their filtering conditions. The matching of raw event 702 to the two mapping rules 704 and 706 triggers the generation of two new mapped events. That is, the same raw event has matched to two different semantic mapping rules, resulting in the creation of two mapped events from the single raw event. In some embodiments, the two mapped events 712 and 718 have the same format and structure and event data as the source or original raw event, but with different mapped names.

The splitting of a single raw event into two different mapped events based on the determination of different types of events (with different types of semantics) present in the original raw event facilitates configuration of stateful metrics. Suppose that a designer of a stateful metric would like to design two stateful metrics, where one stateful metric is based on when clicking movies have occurred, and the other stateful metric based on the occurrence of when successful requests having occurred. Without the semantic mapping, the user would have to know to not only specify events named "network_request_event" as part of the factor in their metric, but would also have to know to delve into specific key/value pairs. In contrast, by using semantic mapping, the user need only search using a query for "successful request," and the mapped events with the semantically meaningful name "successful_request" would be returned as an option (where the list of mapped event names is searchable, for example via platform 100).

In this example, the single raw event would match to the filtering component of both semantic mapping functions 704 and 706. In this case, rather than both the successful request and the clicking movie events being tied or bound to one event, their semantics are captured in two different mapped event objects that are generated from the single raw event.

Compression of Mapped Events

In some embodiments, the generation of mapped events from input raw events involves the creation of new data. The creation of new data involves consumption of CPU (central processing unit) cycles and memory space. For example, generating a new mapped event that is a copy of the raw event (but with different naming/semantics) involves duplication of data. This includes addition of CPU cycles, storage, and I/O (input/output) for handling the newly generated information. In some embodiments, to reduce the amount of storage needed for handling the newly created mapped events, compression is performed.

The following are examples and embodiments of compression. As one example, mapped events are aligned based on their attributes. Suppose that one raw event resulted in the generation of 10 different mapped events. In this example, the 10 different mapped events have different names, but the same event attribute data that is copied over from the originating input raw event. In some embodiments, columnar storage is utilized to facilitate compression of duplicate data, in which data (mapped events) with the same column data or attributes is stored together.

Sampling and Preview Generation for Configuration of Semantic Mapping Functions

In FIG. 2A an example of a semantic mapping function configuration user interface was shown. In the example of FIG. 2A, the user interface is used to support exploration of raw event data to aid the user in determining what semantic mapping functions or rules should be generated. In this example, the user interface is configured to provide insights about patterns in the raw data, as well as a navigable experience (e.g., to search through events). The following are embodiments of supporting such functionality in the presence of large volumes of raw event data.

In some embodiments, the platform performs sampling (e.g., using raw event sampling engine 134) to facilitate efficient navigation through raw event data by providing patterns in the raw event traffic. In some embodiments, sampling is performed to reduce computational cost, as compared to performing calculations to display all observed statistics for all attributes in all ingested events.

For example, at 208 in FIG. 2A, it is shown that at that time, there are approximately 2.01 million network events. In some embodiments, the number of events is extrapolated or calculated based on the percentage of raw event data being ingested by platform 100. This is in contrast to, for example, counting and keeping track of every single network request raw event from the total events that are being ingested.

As one example, suppose that one billion events are ingested. To generate the exploration and mapping interface of FIG. 2A, a subset of the events (e.g., a sample of five million events) is used to power the exploration and mapping interface. That is, the one billion raw events are down-sampled to five million events, where what is shown in the configuration user interface is based on the sampled events. (During mapping time, the set of mapping functions is still applied to all of the full set of one billion events that are being ingested when stateful metrics are ultimately computed). In some embodiments, to provide the designer/user sufficient data to explore and understand what mappings to create, the flexible configuration user interface of FIG. 2A is generated on a sample of the input raw event data. In this way, a dynamic configuration user interface can be generated and loaded quickly that provides information about the actual data that is coming in. In this way, the user is able to view actual traffic patterns in the raw events that are being ingested in real-time, such as viewing information about the actual attribute values that are included in actual raw events being ingested (the patterns of which may change over time) so that the user can understand the raw event data. In some embodiments, the patterns or statistics extracted or otherwise determined from the sampled raw events are determined by pattern evaluation engine 132 of platform 100. The ability to explore raw events and understand what raw events are coming in, such as the number of raw events of certain types that are being ingested, the type/number of attributes in raw events, as well as the different values (and their volumes) for the tags in ingested raw data, provides users important information about raw events when configuring semantic mapping functions.

Without the traffic preview portion of FIG. 2A, the designer of the semantic mapping functions would not know what type of events are being ingested or collected by the platform, and would not know what raw events (and what raw event names, key-values, etc.) to map to. Further, without the traffic volume information, the designer will not be able to differentiate between events with significant use versus ones with less importance (where the traffic volume can be indicative of relative importance or significant use).

Providing of configuration user interfaces such as that shown in FIG. 2A by platform 100 provides various benefits, such as addressing the issue that configuration users may not know what raw events are coming from their own client applications. Via the exploration user interface of FIG. 2A, users can explore the raw data, as well as view the events and their keys/values, as well as determine what raw events have been semantically mapped or have not yet been mapped.

As described above, providing such explorable traffic pattern information pertaining to ingested raw events (e.g., to see within events at their keys and values, as well as determine whether they have been mapped or not mapped) can be prohibitive or computational expensive to perform for a real-time interface. That is, it may be too prohibitive to support exploration on all possible raw events. As described above, to address this, platform 100 is configured to sample raw events.

The following are further embodiments regarding providing of an explorable interface for configuring semantic mapping functions. In some embodiments, a random percentage of raw events is obtained (e.g., via the sampling described above). The names and attributes of the random sampling of raw events are determined and used to generate the explorable, real-time view of raw events shown in the example user interface of FIG. 2A. For example, the enumeration of all of the tags and values for the sampled raw events is determined and shown. For example, a sampling of events is taken. For each of the sampled events, the event name, attributes, and attribute values are extracted and recorded. Statistics on the event names, attributes, and attribute values are also determined (e.g., the number of each observed). The statistics for the event names, attributes, and attribute values are then provided in a configuration user interface such as that shown in FIG. 2A as identified patterns in the raw event traffic. The user may then use the traffic preview data to define semantic mapping functions, as described in further detail above in conjunction with the examples of FIGS. 2B and 2C. For example, without being presented the patterns of the raw event traffic, the user would have difficulty understanding the shape of the raw event data being ingested, and it would be challenging for a user to define meaningful semantic mappings. The platform provides information about the actual data (e.g., the number of times certain events with certain names, attributes, and/or values occur in the actual raw data) so that the user can determine an understanding of the raw data. The patterns or statistics of the number of events, attributes, and/or attribute values are beneficial for users to assign semantic meaning to the raw traffic data.

In some embodiments, by performing a sampling, the full cardinality (e.g., all possible tag keys and values) of raw events is maintained. The calculation of how many times an event with a certain name, a key, and/or value appeared is computed from the sampled raw events. In some embodiments, the random sampling is uniform. In this way, the statistics of the appearance of certain attributes/values/raw event names in ingested raw data are preserved. By providing such information, the user is better able to understand and have a sense of their data in order to define semantic mappings, such as the ratio of screen view events to button click events to understand what sorts of raw events are being emitted from client applications.

In the example of FIG. 2A, an approximation or estimate of the observed event names, tags, and tag values provides a form of curation to facilitate the user's understanding of the raw event traffic and to support preparing of data for analysis, where the preparation includes configuration of semantic mapping and stateful metrics definition.

By providing such preview data with respect to raw traffic data, configuration and computation of stateful metrics are facilitated. For example, the semantic mapping described herein is an intermediate step in a two-stage process in which raw events are inputted, and stateful metrics derived from such input raw events are outputted. The semantic transformations provide an intermediate step of converting raw events to semantically meaningful mapped events, where the stateful metrics are defined off of mapped events.

Embodiments of the semantic mapping techniques described herein facilitate the generation of complex stateful metrics dependent on numerous events that may be separated in time. For example, suppose a stateful metric that is a function of ten different mapped events. Without providing semantically interpretable descriptions or labels to the events, then it becomes intractable for a metrics designer to grasp what events are needed to create such metrics. As the number of events needed to compute a stateful metrics increases, the complexity of defining the metric increases exponentially. By facilitating the assigning of semantic meaning to arbitrary raw events, the links among events can be surfaced or presented to metrics designers so that they can better understand those relationships and create stateful metrics.

In some embodiments, after semantic mapping and stateful metrics definition has been performed, separate interfaces are provided by platform 100 in which users can view and perform analytics on the full-scale ingested raw data. As one example, in such an analytics interface, the user can see the accurate total values for events.

Further Embodiments Regarding Semantic Transformations

In the above examples, the transformation of raw events to mapped events included generating a copy of the raw event, including inheriting its event data, and renaming the copy of the raw event to have the mapped name event. Other types of transformations may be performed. Further embodiments of semantic transformations are described below.

In the above examples, applying a semantic transformation included converting the name of the raw event to a mapped event name in the newly generated mapped event object. As another example, semantic transformation includes mapping the raw attributes to mapped attributes, such as by renaming attributes (e.g., tags or keys) in the mapped event object. In some embodiments, which attributes are renamed is configurable. For example, suppose that a raw event has 50 attributes. A designer can configure a semantic mapping function to rename three of those attributes in the mapped event object.

The transformation component supports other types of transformation actions as well when generating a mapped event object from a raw event. One example action is to drop or discard an attribute. In some embodiments, multiple transformation actions can be configured in a transformation component. For example, one attribute in the raw event can be specified to be dropped in the mapped event, while another attribute is to be renamed in the mapped event (e.g., applying semantics at the attribute level). As another example, the transformation component can be defined to create a new mapped event with an attribute value that is the output of a numerical operation (defined in the transformation component) to which an attribute value in the raw event is provided as input. As another example, a format of an attribute value can be changed or converted in the mapped event as compared to the raw event according to the transformation component (e.g., from a string value to an integer value). Other types of conversions or translations of portions of a raw event when generating a new mapped event may be specified in the transformation component of a semantic mapping function.

As shown in this example, the filtering component of the semantic mapping function defines the events to be treated by the semantic mapping function, where the transformation component of the semantic mapping function defines the actions that are to be performed to manipulate the raw event into a mapped event object with the desired semantics to support building stateful metrics.

In the above examples, for illustrative purposes, raw events were shown with a data structure that included an event name and a list of key/value pairs. In various embodiments, the semantic mapping functions may be configured to accommodate other types of raw event data structures. For example, other types of raw event data structures include a log line in a log that is in a string format. As one example, the filtering component is configured to filter for such events by parsing log lines from a raw event to identify matching raw events. For example, different filtering rules/conditions are constructed for different types of raw events. In the case of a log line string, one example of a filtering component function is a regular expression rule that extracts certain fields out of a string. The filtering component can be configured to filter based on arbitrary conditions and input raw event formats.

The transformation component can be configured to also generate a mapped event object with desired semantics that is in a data structure format different from the input raw event format. As one example, in the above, the filtering component is configured to handle log strings. The transformation component for the semantic mapping function can be constructed to generate a mapped event with key value pairs out of the input log line. That is, in some embodiments, the semantic mapping function takes as input a raw event with a first type of data structure or format, and transforms or maps the input raw event into a mapped event with a different type of data structure than the raw event. The filtering component is configured to perform filtering based on the data structure type of the input raw events. For example, the filtering is a regular expression to identify a specific element within a string. The mapping portion then transforms that element into a mapped event of another type, such as a key-value pair. In some embodiments, the mapping component of the semantic mapping function is configured to provide a schema for the mapped event. In addition to unifying semantics for differently named raw events (that a user decides are semantically equivalent and should be renamed accordingly), the mapping functions can also be used to regularize the schema of raw events (that should be treated as semantically equivalent) into a common or standardized data format of mapped events that the system is able to then process.

Further Embodiments of Stateful Metrics

The following are further embodiments of configuration and computation of stateful metrics based on mapped events generated based on semantic transformations applied to raw events.

Configuration of Stateful Metrics

The following are embodiments of building stateful metrics. In some embodiments, configuration of a stateful metric includes specifying a function whose inputs include multiple mapped events. One example of a stateful metric is a duration metric that computes the time difference between events (which in some embodiments are associated with timestamps indicating when they were emitted and/or transmitted by the client-device, or ingested by platform 100). For example, the stateful metric includes a function that is based on cross-event sequential relationships or other cross-event information. In this example, the duration or interval metric between two events is captured by configuring a function that determines a sequential time-wise relationship between different mapped events. In some embodiments, when determining mapped events to include as part of the function, the platform provides the user a search interface by which to query for mapped events. For example, the platform supports the ability to search for mapped events by the target semantic names or labels that have been specified in semantic mapping functions, and that are to be applied to mapped events. In this way, the metrics designer need not search for events based on their raw event names. Further, the user need not write different metrics for raw events from different applications that are named differently, but would otherwise be used in the same way in the function (because they have the same semantics). For example, referring to FIG. 6, a single stateful metric can be configured that refers to the semantic label of "app_view" as a component, instead of having to write one version of the metric for taking as input JavaScript versions of the raw event of interest, and a second version of the metric for taking as input iOS versions of the raw event. This is supported by configuration of a semantic mapping function that is used to perform per-raw event semantic annotation to generate mapped events with a unified semantic/name space. As shown in this example, the semantic mapping is an intermediate step of a two-stage process that assists or facilitates the creation and computation of such stateful metrics. For example, consider a stateful metric that involves calculating the duration or difference between two events from a same video session. One example of the complexity involved in computing such a stateful metric is in locating or identifying or finding the correct pair of events to perform the calculation on. The finding of the correct pair of events can be difficult to determine if working directly from raw events. The semantic mapping described herein facilitates identifying of the appropriate pairs of events to compute the desired metrics, as they can be identified by the semantic labels to which they have been mapped.

Stateful metrics computed from two or more mapped events can be of arbitrary complexity. As one example, in the video space, a stateful metric can be configured that relates to buffering ratio connection into rebuffering that requires play buffering events, seek events, etc., all of which may be emitted and/or ingested at different times in the raw event stream.

As shown above, in some embodiments, a stateful metric is configured to combine multiple events (that may arrive to platform 100 separated in time) to compute a metric. In some embodiments, the platform 100 provides a searchable data store of mapped event names. Via a metrics configuration user interface, a user is able to query for various mapped events by their mapped event names. The user interface then provides various options for defining functions that incorporate mapped event names selected by the user (e.g., via selection of mapped event names from a user interface, as the result of a search query for mapped event names that match search query criteria, etc.). In some embodiments, the stateful metrics configurations are stored. At computation time, stateful metrics computation engine 120 is then configured to determine stateful metrics on mapped events according to the stateful metrics definitions.

In some embodiments, configuration of stateful metrics is facilitated via stateful metrics templates. For example, the platform includes templates for different types of stateful metrics. One example stateful metrics template is an interval metric template that identifies two or more mapped events and computes a difference in time between those mapped events (e.g., according to associated timestamps). Another example stateful metrics template is a conversion metric that defines a percentage of video streaming sessions that had a first mapped event but not the second mapped event. The above metrics templates are two example stateful metrics configurations.

While embodiments of building stateful metrics using mapped events are described herein, stateful metrics can also be built from raw events as well. In some embodiments, platform 100 is configured to present stateful metrics configuration interfaces. In some embodiments, generating the configuration interface includes determining options selectable by users as UI (user interface) elements. In various embodiments, the selectable UI options include available events from which to build stateful metrics. For example, mapped events are made available for selection (e.g., for querying/being shown in the UI). In some embodiments, raw events are provided as options. In other embodiments, raw events are hidden. In some embodiments, whether raw events are available as options when configuring stateful metrics is configurable.

In some embodiments, defining a stateful metric includes defining an operator scope. In some embodiments, the operator scope provides a definition or bounds of mapped events usable to perform computation of the metric. One example of an operator scope is a video streaming session. For example, the metrics computation is generated on a per-video streaming session basis, where the mapped events upon which the stateful metric is computed are required to be within the same session. For example, the operator scope is used to identify the collection of mapped events that computation of a stateful metric operates on. In this example, a stateful metric is defined based on mapped events within a certain scope.

Computation of Stateful Metrics at Ingestion Time

The following are further embodiments of computing stateful metrics at ingestion time.

As shown in the above examples, at ingestion time, the determination or computation of a stateful metric is a two-stage operation. First, a semantic mapping is performed on a raw event to generate a mapped event. The mapped event is then used in the computation of the stateful metric. In this way, assignment of semantic meaning is performed prior to determination of the actual stateful metric.

In some embodiments, the platform includes a pass-through option, in which a raw event is allowed to pass through to being accessible for stateful metrics computation, without having been mapped or gone through a semantic transformation or manipulation (e.g., because it is determined that the raw event is semantically meaningful as is).

Figure 8:
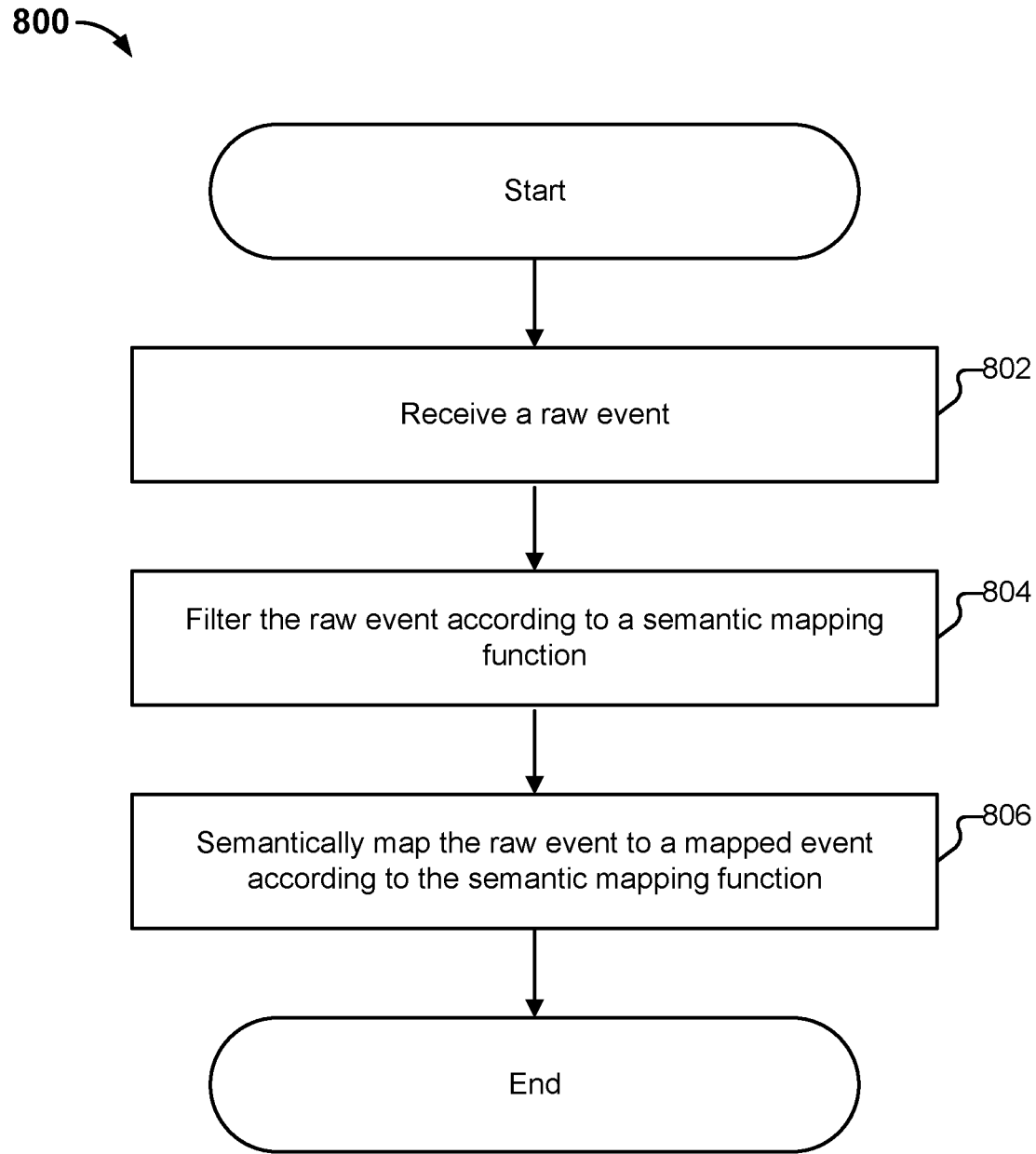
FIG. 8 is a flow diagram illustrating an embodiment of a process for performing semantic mapping.

FIG. 8 is a flow diagram illustrating an embodiment of a process for performing semantic mapping. In some embodiments, process 800 is executed by semantic mapping engine 114. The process begins at 802, when a raw event is received. At 804, the raw event is filtered according to a semantic mapping function. For example, it is determined that the raw event matches to a filtering component of the semantic mapping function. For example, the filtering component includes a set of raw event filtering conditions. For example, a raw event filtering condition includes a specification of a raw event and/or any other specified attributes and/or attribute values used to filter raw events. For example, filtering conditions may be defined based on any portion or combinations of portions of a raw event. Further examples of filtering conditions are described above.

At 806, the raw event is semantically mapped to a mapped event according to the semantic mapping function. For example, in response to determining that the raw event matches to the filtering component of the semantic mapping function in 804, a new mapped event is generated at least in part by transforming the raw event according to a transformation component of the semantic mapping function. As one example of performing step 806, the new mapped event is generated as a renamed copy of the raw event, where the name (e.g., semantic label) for the new mapped event is specified in the transformation component of the semantic mapping function.

As described above, different types of raw events (e.g., collected from different client applications) may match to the same semantic mapping function, resulting in new mapped events with the same assigned or unified semantic space. In some embodiments, a raw event may match to multiple semantic mapping functions, resulting in multiple new mapped events being derived from the single originating raw input event.

In some embodiments, the semantic mapping function is defined or configured. For example, a configuration user interface for defining the semantic mapping function is provided. In some embodiments, to facilitate defining of semantic mapping functions, the configuration user interface is configured to present information pertaining to patterns in ingested raw event data. For example, as described above, numerical patterns or statistics pertaining to raw events, such as the number of observed event names, event attributes, and/or event attribute values are presented. In some embodiments, the numerical patterns or statistics are determined from a sampling of raw events taken from collected streams of raw event data. Further details and embodiments regarding semantic mapping function configuration are described above.

Figure 9:
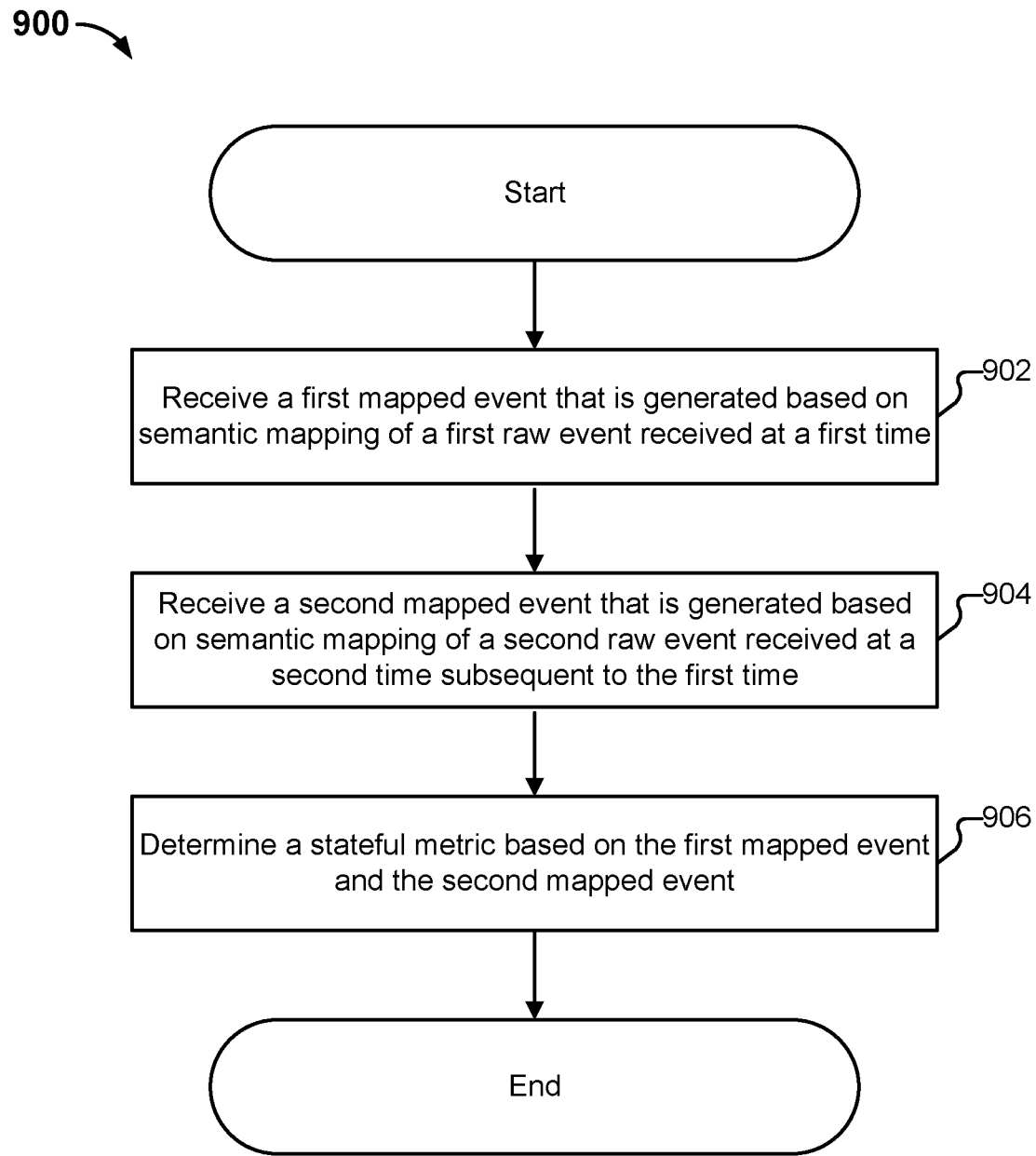
FIG. 9 is a flow diagram illustrating an embodiment of a process for performing stateful metric computation.

FIG. 9 is a flow diagram illustrating an embodiment of a process for performing stateful metric computation. In some embodiments, process 900 is executed by stateful metrics computation engine 120 of FIG. 1. The process begins at 902, when a first mapped event is received, where the first mapped event is derived from a first raw event associated with a first time. For example, the first raw event is semantically mapped to the first mapped event, where the first mapped event is generated based on applying a semantic mapping to the first raw event. At 904, a second mapped event is received, where the second mapped event is derived from a second raw event associated with a second time that is different from the first time. For example, the first and second raw events are separated in time in a stream of ingested raw events (and are associated with different timestamps), where the second raw event was received, collected, or ingested at a time subsequent to the first raw event. The first and second raw events may be collected from a client device. In some embodiments, the first and second mapped events are generated using process 800 of FIG. 8. For example, the first mapped event is generated based on the first raw event matching a filtering component of a first semantic mapping function. In response to the first raw event matching the filtering component of the first semantic mapping function, the first mapped event is generated from the first raw event according to a transformation or mapping component of the first semantic mapping function that defines a mapping between the first raw event and the first mapped event. Similarly, the second mapped event is generated based on the second raw event matching to a second semantic mapping function.

In some embodiments, the first and second mapped events are grouped together in a shuffling stage. For example, mapped events are grouped together according to a scope. For example, mapped events having a common or shared or same session identifier are grouped together (so that mapped events belonging to the same session are grouped together). For example, raw events ingested by a system such as platform 100 may come from many active sessions. In some embodiments, to perform stateful metric computation (as well as the semantic mapping of the two events), events belonging to the same session (based, for example, on a shared or common identifier) are identified. For example, at 904, the second mapped event is received for the same session as the first mapped event.

At 906, a stateful metric is computed based on the first mapped event and the second mapped event. In some embodiments, the stateful metric is computed in real-time, as raw events are ingested and semantically mapped. In some embodiments, the stateful metric is defined according to a stateful metrics template, further details of which are described above. Examples of a stateful metric include an interval or duration between the first and second mapped events.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a first mapped event that is generated based on semantic mapping of a first raw event associated with a first time, wherein the first mapped event is generated according to a first semantic mapping function configured via a user interface, and wherein a preview of raw event traffic is presented via the user interface;
receive a second mapped event that is generated based on semantic mapping of a second raw event associated with a second time that is subsequent to the first time; and
determine a stateful metric based on the first mapped event and the second mapped event that are generated from the first and second raw events that are separated in time; and
a memory coupled to the processor and configured to provide the processor with instructions.

2. The system of claim 1, wherein the first semantic mapping function comprises a filtering component and a semantic transformation component.

3. The system of claim 2, wherein the first raw event is determined to match to the filtering component of the first semantic mapping function.

4. The system of claim 3, wherein in response to the first raw event matching to the filtering component of the first semantic mapping function, the first mapped event is generated at least in part by applying a semantic transformation to the first raw event according to the semantic transformation component of the first semantic mapping function.

5. The system of claim 4, wherein applying the semantic transformation comprises applying a semantic label to the first mapped event.

6. The system of claim 5, wherein the first mapped event comprises a copy of the first raw event that is renamed with the semantic label.

7. The system of claim 5, wherein a specification of the stateful metric refers to the semantic label.

8. The system of claim 1, wherein determining the stateful metric comprises determining a duration between the first time associated with the first raw event and the second time associated with the second raw event.

9. The system of claim 1, wherein the stateful metric is configured according to a metrics template.

10. A method, comprising:
receiving a first mapped event that is generated based on semantic mapping of a first raw event associated with a first time, wherein the first mapped event is generated according to a first semantic mapping function configured via a user interface, and wherein a preview of raw event traffic is presented via the user interface;
receiving a second mapped event that is generated based on semantic mapping of a second raw event associated with a second time that is subsequent to the first time; and
determining a stateful metric based on the first mapped event and the second mapped event that are generated from the first and second raw events that are separated in time.

11. The method of claim 10, wherein the first semantic mapping function comprises a filtering component and a semantic transformation component.

12. The method of claim 11, wherein the first raw event is determined to match to the filtering component of the first semantic mapping function.

13. The method of claim 12, wherein in response to the first raw event matching to the filtering component of the first semantic mapping function, the first mapped event is generated at least in part by applying a semantic transformation to the first raw event according to the semantic transformation component of the first semantic mapping function.

14. The method of claim 13, wherein applying the semantic transformation comprises applying a semantic label to the first mapped event.

15. The method of claim 14, wherein the first mapped event comprises a copy of the first raw event that is renamed with the semantic label.

16. The method of claim 14, wherein a specification of the stateful metric refers to the semantic label.

17. The method of claim 10, wherein determining the stateful metric comprises determining a duration between the first time associated with the first raw event and the second time associated with the second raw event.

18. The method of claim 10, wherein the stateful metric is configured according to a metrics template.

19. A computer program product embodied in a non-transitory computer readable medium and comprising computer instructions for:
receiving a first mapped event that is generated based on semantic mapping of a first raw event associated with a first time, wherein the first mapped event is generated according to a first semantic mapping function configured via a user interface, and wherein a preview of raw event traffic is presented via the user interface;
receiving a second mapped event that is generated based on semantic mapping of a second raw event associated with a second time that is subsequent to the first time; and
determining a stateful metric based on the first mapped event and the second mapped event that are generated from the first and second raw events that are separated in time.

* * * * *